United States Patent

[11] 3,558,867

| | | |
|---|---|---|
| [72] | Inventor | Henry D. Pahl, Jr.<br>99 Cross St., Belmont, Mass. 02178 |
| [21] | Appl. No. | 768,047 |
| [22] | Filed | Oct. 16, 1968 |
| [45] | Patented | Jan. 26, 1971 |

[54] INTEGRATING COMPUTER
7 Claims, 2 Drawing Figs.

[52] U.S. Cl. .................................................. 235/183,
324/70; 328/127
[51] Int. Cl. .................................................. G06g 7/18,
G06g 7/48
[50] Field of Search .................................................. 235/183,
184; 324/68, 70CC, 168, 171 (Foreign); 328/127

[56] References Cited
UNITED STATES PATENTS

| | | | |
|---|---|---|---|
| 3,348,143 | 10/1967 | Young .......................... | 324/70 |
| 3,358,230 | 12/1967 | Wiley .......................... | 324/70 |
| 3,381,230 | 4/1968 | Gilbert et al. ................. | 235/183X |
| 3,383,603 | 5/1968 | Oleson .......................... | 328/127 |

Primary Examiner—Malcolm A. Morrison
Assistant Examiner—Felix D. Gruber

ABSTRACT: An integrating computer is disclosed which continuously computes time of deviation from that elapsed time which would be required to maintain a preselected average speed over the distance actually traveled. A preselected current which is an inverse function of the preselected average speed is applied to an integrator for a preselected interval each time a unit of distance is traversed. A current in the opposite direction is applied to the integrator continuously to represent the passage of time. The integrator accordingly provides an output signal which varies substantially in proportion to the time of deviation from that elapsed time which would be required to maintain the preselected average speed.

PATENTED JAN 26 1971 3,558,867

Henry D. Pahl, Jr.
Inventor

INTEGRATING COMPUTER

BACKGROUND OF THE INVENTION

This invention relates to an integrating computer and more particularly to such a computer which will continuously compute time of deviation from that elapsed time which would be required to maintain a preselected average speed over a distance actually traveled.

In sport car rallies of the so-called time-speed-distance type and in certain other aircraft and marine navigational situations, it is desirable to know if a preselected average speed has been maintained or if there is any deviation from the preselected speed.

Among the several objects of the present invention may be noted the provision of apparatus for continuously computing time of deviation from that elapsed time which would be required to maintain a preselected average speed; the provision of such apparatus which will compute time of deviation continuously; the provision of such apparatus which is highly accurate; the provision of such apparatus which consumes very little power; and the provision of such apparatus which is relatively simple and inexpensive.

SUMMARY OF THE INVENTION

Briefly, apparatus of this invention will continuously compute time of deviation from that elapsed time which would be required to maintain the preselected average speed over a distance actually traveled. The apparatus includes an integrator circuit which has an input terminal and an output terminal and is operative to provide at the output terminal an output voltage which varies as a function of the time integral of current signals applied to the input terminal. A first current signal of predetermined amplitude is applied to the integrator circuit input terminal in a first direction for causing the integrator output signal voltage to change value at a predetermined rate indicating the passage of time. Means are also provided for applying to the integrator a preselected current representing the preselected speed for a preselected interval each time a predetermined increment of distance is traveled, the preselected current being applied in a direction opposite the first said direction. The means for applying the preselected current includes means for selectively varying the amplitude of the preselected current to vary the preselected average speed. Accordingly, the output signal voltage provided by the integrator varies substantially in proportion to the time of deviation from that elapsed time which would be required to maintain the preselected average speed.

BRIEF DESCRIPTION OF THE DRAWINGS

Corresponding reference characters indicate corresponding parts throughout the several views of the drawings.

Referring now to FIG. 1, the apparatus illustrated there is adapted for use in an automobile and is operative to provide a continuous indication of time of deviation from a desired average speed, such information being useful during participation in sport car rallies where the object is to arrive exactly on time at an unknown point, based on a preselected average speed. A gear box 11 is provided which adapted to be driven from the speedometer cable 13 of the automobile within which the apparatus is installed. The gear box drives an eccentric cam 15. A cam follower 17 engages the cam and operates a switch SW1 once for each revolution of the cam. The opening and closing of switch SW1 thus provides a signal each time a predetermined increment of distance is traveled by the automobile. A convenient unit of distance is .01 (1/100) of a mile and gear box and switch units providing such an operation are available commercially for use in electric odometers. If desired for electrical isolation, a relay may be interposed between the switch SW1 and the computer, relay contacts being used in place of the switch.

Figure 1:
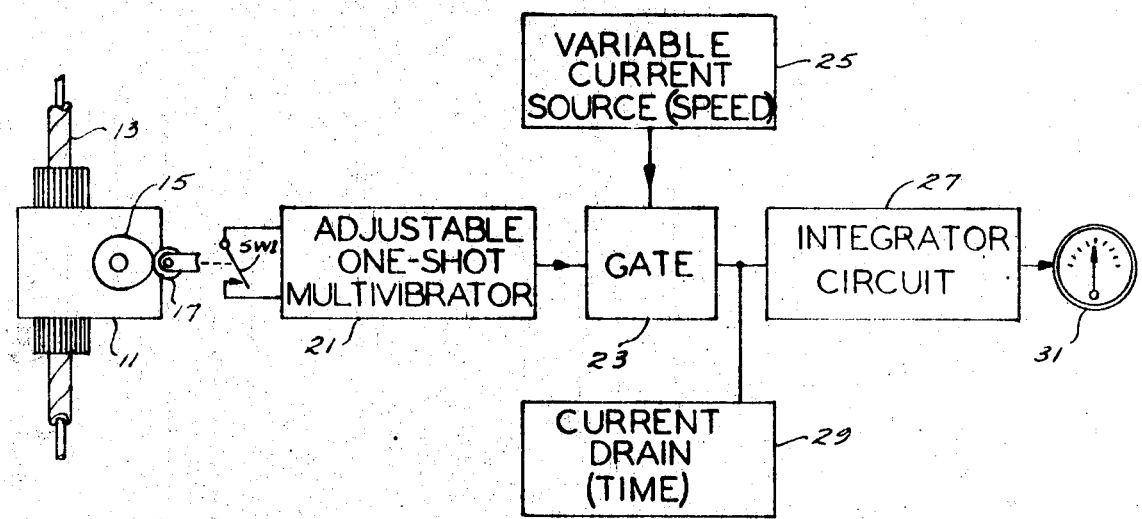
FIG. 1 is a block diagram of an integrating computer of this invention.

The operation of switch SW1 triggers a monostable or one-shot multivibrator 21 which provides a square wave pulse of preselectable duration each time the switch is operated. Preferably the duration of the pulse is manually adjustable. The pulse provided by multivibrator 21 opens a gate circuit 23 which allows current to flow from a variable current source 25 to the input terminal of an integrator circuit 27 for a preselected time interval equal to the duration of the multivibrator output pulse. Integrator 27 is a circuit which, as will be apparent hereinafter, provides at its output terminal a voltage which varies as a function of the time integral of current signals applied to its input terminal. This output voltage is indicated on a zero-center meter 31. The total charge which is transferred into the integrator circuit by the operation of the multivibrator is thus a function of both the duration of the multivibrator pulse and also the amplitude of the current provided by the variable source 25. As is explained in greater detail hereinafter, this increment of charge represents the increment of time which is allotted or which would pass if the predetermined distance increment were traversed at the preselected speed.

A current drain 29 is also applied to the input terminal of integrator circuit 27. This drain continuously draws charge from the integrator. As will also be apparent hereinafter, this draining of charge represents the passage of time.

The operation of this apparatus is substantially as follows. As the vehicle advances, the multivibrator 21 is repeatedly triggered to open gate 23. Each time gate 23 is opened, it admits current into the integrator circuit for a predetermined time so that an increment of charge is added which represents the time allotted to travel the increment of distance at the preselected speed and which causes the integrator output voltage to change accordingly. The addition of this increment of charge to the integrator circuit 27 causes the needle of meter 31 to shift an increment in one direction, e.g., to the right. At the same time, the current drain 29 is continuously removing charge from the integrator circuit 27 to represent the passage of time so that the needle of meter 31 moves to the left between current pulses admitted from the source 25. When the repeated addition of charge substantially balances the charge drain, the meter needle will remain substantially stationary (ignoring incremental fluctuations) indicating that the time actually spent traversing a given distance is equal to the time allotted. Further, any shift of the needle from the center position represents the time of deviation from that elapsed time which would be actually required to maintain the preselected average speed over the distance actually traveled. The meter 31 is conveniently calibrated in units of .01 (1/100) of a minute for rally purposes.

Figure 2:
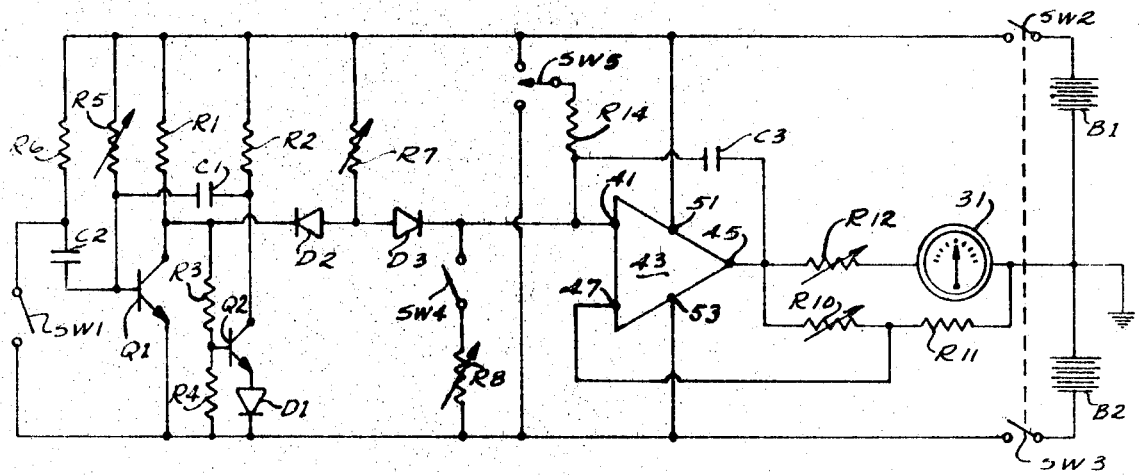
FIG. 2 is a schematic circuit diagram of the computer.

Particular circuitry providing the functions illustrated generally with reference to FIG. 1 is shown in FIG. 2. Current for energizing this circuitry is provided through a pair of switches SW2 and SW3 from a pair of batteries B1 and B2 which provide positive and negative potentials, respectively, relative to ground. The multivibrator 21 comprises a pair of NPN transistors Q1 and Q2 each of which is provided with a respective collector load resistor R1 and R2. The emitter of Q1 is connected to the negative supply lead while the emitter of transistor Q2 is connected to that lead through a diode D1. The collector of transistor Q1 is coupled to the base of transistor Q2 through a voltage divider comprising a pair of resistors R3 and R4 and the collector of transistor Q2 is coupled to the base of transistor Q1 through a capacitor C1. Transistor Q1 is normally biased into conduction through a variable resistance R5 which also, as will be apparent to those skilled in the art, provides a multivibrator pulse timing function in cooperation with capacitor C1. When multivibrator 21 is in its normal or quiescent state, transistor Q1 is biased on by current flowing through resistor R5 and transistor Q2 is cut off. The voltage drop across diode D1 aids in assuring that transistor Q2 is completely cut off. This voltage drop also aids in compensating for temperature variations in the base-emitter threshold of transistor Q1 which might otherwise permit temperature induced variations in the duration of the pulse provided by the multivibrator.

One side of switch SW1 is connected to the negative supply lead and the other side is connected, through a small-valued pulse-coupling capacitor C2, to the base of transistor Q1. When switch SW1 is open capacitor C2 is charged through a resistor R6. When switch SW1 is closed, a negative-going pulse is transmitted through capacitor C2 to base of transistor Q1 thereby initiating a positive-going pulse to the collector of transistor Q1. Transistor Q2 is turned on by this positive-going pulse and provides at its collector a negative-going pulse. The negative-going pulse is coupled, back through capacitor C1, to the base of transistor Q1. The multivibrator is thus switched into its unstable state as will be understood by those skilled in the art. This unstable state lasts for a predetermined interval determined by the relative values of capacitor C1 and resistor R5. After capacitor C1 is discharged by current flowing through resistor R5, transistor Q1 will again be turned on and the multivibrator will revert to its original stable state. In the meantime a square-topped positive-going pulse is generated at the collector of transistor Q1.

The gate 23 comprises a pair of diodes D2 and D3 connected anode to anode and the variable current source 25 comprises a variable resistance R7 connecting the junction between the two diodes to the positive supply lead. The cathode of diode D2 is connected to the collector of transistor Q1 and the cathode of diode D3 is connected to the inverting input terminal 41 of a differential-input operational amplifier 43. Amplifier 43 also includes an output terminal 45 and a noninverting input terminal 47, positive and negative supply voltages being provided to the amplifier at a pair of terminals 51 and 53. Amplifier 43 is operative in conventional manner to provide at the output terminal 45 an output signal which is variable as an in-phase function of signals supplied to the noninverting input terminal 47 and as an out-of-phase function of signals supplied to the inverting input terminal 41. Output terminal 45 is connected to the inverting or out-of-phase input terminal 41 through a capacitor C3 which is of relatively large value and functions as a signal or charge accumulator. As is understood by those skilled in the art, the connection of a capacitor in this way causes the amplifier 43 to function as a so-called integrator circuit which provides an output voltage which varies as the time integral of current signals applied to the input terminal 41. In order to provide an integrator which has a leakage time constant which is very large in relation to the time intervals under consideration in the particular computational problem, the amplifier 43 should have an extremely low current drive requirement or an extremely high input impedance. Operational amplifiers having input stages constituted by insulated-gate field-effect transistors are preferable for this reason since the bias or drive current requirements of such amplifiers are essentially infinitesimal. Such amplifiers are commercially available from a substantial number of manufacturers.

In order for the current source provided by R7 and the current drain provided by resistance R8 to be substantially constant even though the output voltage of the integrator varies, it is desirable that the voltage of the input terminal 41 remain substantially constant as the output voltage at terminal 45 varies. As is understood by those skilled in the art, such a condition essentially exists if the amplifier 43 has very high gain, since the feedback provided through capacitor C3 operates to reduce any deviation in the voltage present at input terminal 41. However, according to another aspect of the present invention, it has been found that even a relatively low gain amplifier may be used at 43 and will provide high accuracy if positive feedback is applied around the amplifier. For this purpose, a voltage divider comprising a variable resistance R10 and a fixed resistor R11 is connected between output terminal 45 and ground and operates to apply to the input terminal 47 a voltage which is a preselected portion of the output voltage. This portion is adjusted, by means of the variable resistance R10 so that the loop gain around this path is substantially equal to unity when the other input terminal 41 is held at a fixed voltage. As is understood by those skilled in the art, such a condition would normally produce instability. However, in the integrator circuit in which the amplifier 43 is used, the negative feedback provided through capacitor C3 substantially eliminates instability since, considering the very low current drive requirement of the amplifier, the large capacitor C3 acts substantially as a DC feedback connection, which applies to input terminal 41 a voltage which is the sum of the amplifier output voltage and the capacitor voltage, i.e. the value of the charge accumulation held by the capacitor. Stated another way, any instability which does occur is at a frequency which is determined by the leakage time constant and is thus so low that it does not effect the desired operation.

The positive feedback around the amplifier to input terminal 47 causes the gain of the amplifier with respect to input terminal 41 to be so high as to be essentially indefinite. Accordingly, as the output signal varies, the voltage at the input terminal 41 does not vary significantly. In fact, the polarity or sense of variation of voltage at the input terminal with respect to variation in the output voltage can be caused to reverse as the loop gain with respect to input terminal 47 is adjusted through unit by means of the variable resistance R10. Accordingly, integration of a very high degree of linearity can be achieved even though the amplifier 43 is of relatively low gain. Thus an amplifier having only two stages of gain may be utilized and still obtain very accurate results.

The output voltage provided at terminal 45 is applied to zero-center meter 31 through a variable resistance R12 which permits the meter to be calibrated in convenient time units.

Operation of the circuit of FIG. 2 is substantially as was described previously with regard to FIG. 1. When the multivibrator is in its quiescent state, current flowing through resistor R7 flows through diode D2 and into the collector circuit of transistor Q1. However, when the multivibrator is tripped and the positive going pulse appears at the collector of transistor Q1, the current through resistor R7 flows through diode D3 to the input terminal 41 of the integrator amplifier 43. Actually, due to the high input impedance of the amplifier, the current actually flows into the capacitor C3, the change of voltage across the capacitor induced thereby appearing at the output terminal of the integrator amplifier 43 due to the feedback operation of the amplifier.

The amount of charge which is transferred into the capacitor C3 by each cycle of operation of the multivibrator varies as an inverse function of the value of resistance R7. Since the time which is allotted to traverse a given increment of distance at a preselected speed varies as the inverse of the value of resistance R7 should be varied in direct proportion to the preselected speed. A series of decade switches or a highly linear 10 turn potentiometer is appropriate for this purpose.

The charge flowing into the integrator through the resistance R7 as a result of traversing one unit of distance is then $\left(\frac{VB1}{R7}\right)(\Delta T)$ where $VB1$ is the voltage of battery B1 and $\Delta T$ is the period of operation of the one-shot multivibrator. On the other hand, the charge flowing out of the integrator through resistor R8 during a given time interval $t$ is $\left(\frac{VB2}{R8}\right)(t)$ where $VB2$ is the voltage of battery B2. If the vehicle is traveling exactly at the preselected speed, the charge flowing out through resistor R8 while the vehicle travels a unit of distance will thus be $\left(\frac{VB2}{R8}\right)(T)$ where T is the time allotted to traverse the unit of distance at the preselected speed.

As noted previously, the charge flowing in should balance the charge flowing out when the actual speed matches the preselected speed, i.e.

$$\left(\frac{VB1}{R7}\right) \cdot (\Delta T) = \left(\frac{VB2}{R8}\right) \cdot (T)$$

Equivalently, $$\frac{\Delta T}{T} = \left(\frac{VB2}{VB1}\right) \cdot \left(\frac{R7}{R8}\right)$$

The absolute values of the various voltages and resistances can vary over a considerable range so long as the range of adjustment of ΔT (by means of resistor R5) and of R8 will permit this proportionality to be achieved.

The amount of charge transferred into capacitor C3 during each multivibrator pulse can also be varied for a given speed by adjusting the pulse duration by means of variable resistance R5. This adjustment constitutes a convenient means of compensating or correcting mileage measurement since the distance increments represented by closings of the switch SW1 may not correspond exactly to true or official mileage. Thus the resistance R5 permits a correction factor to be entered so that the setting of resistance R7 is in terms of true or official mileage, and can be calibrated as such. It can thus be seen that the increment of charge added into capacitor C3 each time the switch SW1 is closed represents the time allotted to traverse the corresponding increment of true mileage at the preselected average speed expressed in terms of true mileage.

When switch SW4 is closed, current flows out of capacitor C3 to the negative supply lead, the charge being bled off representing the passage of time. Adjustment of resistance R8 allows the unit of time to be adjusted and/or corrected. When this bleeding off of charge exactly balances the charge being periodically added to the capacitor C3 by the operation of the multivibrator, the output voltage and the reading of the meter 31 will remain substantially constant thereby indicating that the automobile is proceeding at the desired average speed. Further, any reading on the meter away from its zero-center position will represent time of deviation from that elapsed time which would be required to maintain the preselected average speed over the distance actually traveled, assuming that the current drain was started as forward motion was started.

As it may be desired to preset or to periodically adjust the setting of the meter to compensate for any residual drift or errors in the input settings, charge may be selectively added or withdrawn from the integrator or accumulator capacitor C3 by means of a center-off double-throw switch SW5 which selectively connects the input of the integrator through a resistor R14, to the positive or negative supply lead.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. In apparatus for continuously computing time of deviation from that elapsed time which would be required to maintain a preselected average speed over a distance actually traveled:
   a current integrator circuit having an input terminal and an output terminal and being operative to provide at said output terminal an output voltage which varies as a function of the time integral of current signals applied to said input terminal;
   a first means for applying a current signal to said integrator circuit input terminal continuously during operation of said apparatus, said current signal being applied in a first direction and being of predetermined amplitude for causing, in the absence of other current signals, said integrator output voltage to change value at a predetermined rate indicating the passage of time; and
   a second means for applying current to said integrator circuit input terminal, said second means being operative to apply a preselected current for a preselected time interval each time a predetermined increment of distance is traveled, said preselected current being applied in a direction opposite said first direction, said second current applying means including means for selectively varying the amplitude of said preselected current thereby to select an average speed whereby said output signal voltage varies substantially in proportion to the time of deviation from that elapsed time which would be required to maintain said preselected average speed.

2. Apparatus as set forth in claim 1 wherein said second means for applying current includes a one-shot multivibrator, the current from said second source being applied to said integrator during the operating period of said multivibrator.

3. Apparatus as set forth in claim 2 wherein said one-shot multivibrator includes a variable resistance for adjusting the period of operation of said multivibrator.

4. Apparatus as set forth in claim 2 wherein said second means for applying current includes a gate which is controlled by said multivibrator for passing current from said source to said integrator circuit during the period of operation of said multivibrator.

5. Apparatus as set forth in claim 4 wherein said source comprises a variable resistance for adjusting said preselected current.

6. Apparatus as set forth in claim 4 wherein said gate comprises a pair of diodes.

7. Apparatus as set forth in claim 1 including a zero-center meter for indicating said output voltage.